J. Mills,
Revolving Rake.

No. 106,604. Patented Aug. 23, 1870.

ATTEST.
Jas. A. Layman.
William F. Bauer.

J. Mills
INVENTOR.
By Knight Bros.
(Attys.)

United States Patent Office.

JOSEPH MILLS, OF MILAN, INDIANA.

Letters Patent No. 106,604, dated August 23, 1870.

IMPROVEMENT IN HORSE HAY-RAKES.

The Schedule referred to in these Letters Patent and making part of the same.

I, JOSEPH MILLS, of Milan, Ripley county, Indiana, have invented a new and useful Horse Hay-Rake, of which the following is a specification.

Nature and Objects of the Invention.

This invention relates to that class of horse hay-rakes which consist of a horizontal bar or head armed with a number of teeth or tines, that are adapted to revolve at the proper moment, and deposit the gathered hay in a windrow on the ground; and My invention consists exclusively in certain devices for controlling the operation of the rake proper, which devices will be hereafter fully described.

General Description with Reference to the Drawing.

The head, A, of the rake consists of a stout beam that is armed with two set-off oppositely-projecting teeth or tines, B B', and this head has immovably secured to it, by means of screws or bolts, C, two rings, D D', each of whose periphery is provided with two ratchets, E E', and two pockets, F F'.

The ratchets E E' are designed to engage with the free ends of gravitating pawls G, while the pockets F F' have pivoted within them gravitating latches H H'.

Figure 4:
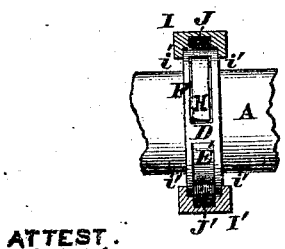
Figure 4 is a section through one of the couplings in the plane of the rake-head.

Surrounding the rings D D', and completely inclosing the devices E E', F F', and H H', are annular clamps, I I', that are hinged to each other at $i$. The pawls G are pivoted to the upper members I. These upper clamps I have recesses, J, sufficiently large to receive the pawls G, and the lower clamps I' have similar recesses, J', to admit either of the latches H H'. Lateral displacement of the clamps is prevented by flanges $i'$, which embrace the sides of the rings D D', as shown in fig. 4.

The clamps I I' have rearward extensions, K K', which are united to the handles L L' of the implement by bolts $i\,i'$, and screw-threaded hooks N N', the latter serving for the attachment of the traces $o\,o'$, by which the horses are hitched to the implement.

Figure 1:
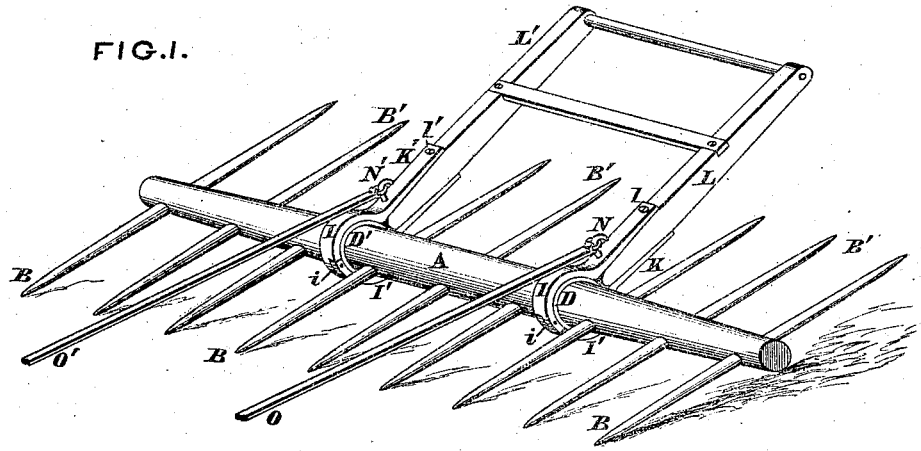
Figure 1 is a perspective view of an implement embodying my improvement, the rake being shown in position for gathering hay.
Figure 2:
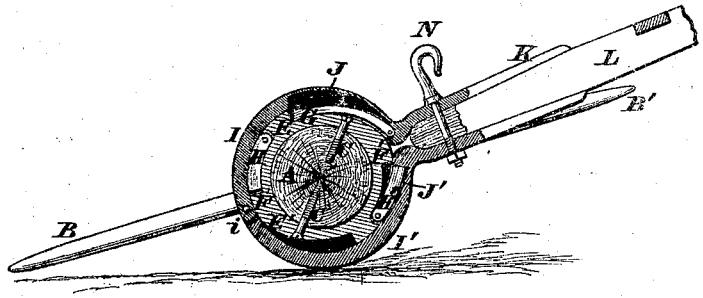
Figure 2 is an enlarged section through one of the couplings, which unite the head of the rake to the handles, the rake being in the gathering position, and the section taken in the plane of the handle.

The operation is as follows:

When the machine is drawn across the field it rests upon the lower clamps I I', which act as runners to the rake, and the forwardly projecting teeth B are depressed sufficiently to gather up the hay, without coming in contact with the ground. In this gathering position of the rake the latches H' impinge against the shoulders of the recesses J', and thereby effectually prevent the rotation of head A and tines B B', while the other latches H are contained within the pockets F of the rings D, as clearly shown in fig. 2.

Figure 3:
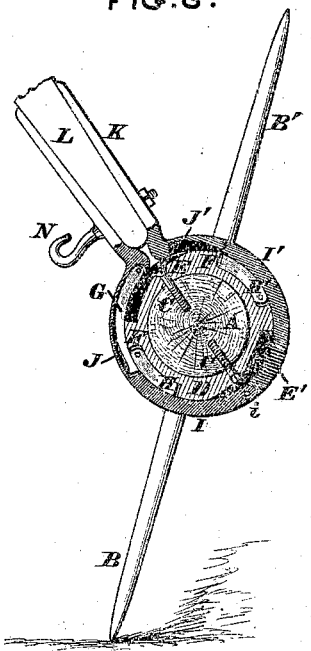
Figure 3 is a section in the same plane as fig. 2, with the handles of the implement thrown forward, and the rake shown as in the act of rotating.

After a sufficient quantity of hay has been gathered upon the tines B, and it is desired to deposit it in a windrow, the rotation of the rake is effected in the following manner: The driver grasps the handles L L' and elevates them so as to lift the head from off the ground, and cause the teeth B to penetrate the same, and, as the horses are drawing the implement forward, this act causes the rake to assume a position like that shown in fig. 3.

When the implement has been brought into this position, the latches H' drop, by their own weight, into the pockets F', and, there being no longer anything to prevent the rotation of head A, it instantly revolves, thereby discharging the gathered hay from the teeth B, and bringing the other set of teeth, B', into the position previously occupied by the ones B.

In this changed position of the implement the pawls G engage with the shoulders of the other ratchets, E', and the latches H now drop into the recesses J', and prevent the rotation of the rake until the handles have again been elevated.

The pawls G striking against the shoulders of one set of the ratchets E E' limit this return movement of the rake-head. The forward inclination of the handle L has been somewhat exaggerated in fig. 3 for the purpose of more clearly exhibiting the operative parts.

It is evident that the ratchets, pawls, and latches can be so arranged as to liberate the head of the rake before the handles have assumed a vertical position.

Claim.

I claim herein as new and of my invention—

The combination, substantially as herein described, of the rake-head A, B B', fixed rings D D', ratchets E E', pockts F F', pawls G, latches H H', hinged and flanged clamps I I', $i\,i'$, recesses J J', extensions K K', and handles L L', for the purpose set forth.

In testimony of which invention I hereunto set my hand.

JOSEPH MILLS.

Witnesses:
  GEO. H. KNIGHT,
  JAMES H. LAYMAN.